United States Patent
Hartley et al.

(10) Patent No.: US 10,674,427 B2
(45) Date of Patent: Jun. 2, 2020

(54) SYSTEM AND METHOD TO SELECT AND OPERATE A MOBILE DEVICE THROUGH A TELEMATICS UNIT

(71) Applicant: GM GLOBAL TECHNOLOGY OPERATIONS LLC, Detroit, MI (US)

(72) Inventors: Steven Hartley, Pointe-Claire (CA); Eero M. Laansoo, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/967,960

(22) Filed: May 1, 2018

(65) Prior Publication Data
US 2020/0045609 A1    Feb. 6, 2020

(51) Int. Cl.
*H04W 40/24* (2009.01)
*H04W 8/20* (2009.01)
*H04M 1/60* (2006.01)

(52) U.S. Cl.
CPC ......... *H04W 40/248* (2013.01); *H04W 8/205* (2013.01); *H04M 1/6075* (2013.01)

(58) Field of Classification Search
CPC ......... H04W 8/04; H04W 8/20; H04W 12/02; H04W 40/248; H04W 8/205; H04L 67/1095; H04L 63/0428; H04L 63/083
See application file for complete search history.

(56) References Cited

U.S. PATENT DOCUMENTS

| | | | |
|---|---|---|---|
| 7,975,287 B2 * | 7/2011 | Hung ................. | H04W 12/06 726/2 |
| 2012/0196587 A1 * | 8/2012 | Tysowski .............. | H04W 8/205 455/418 |
| 2015/0105064 A1 * | 4/2015 | Chen .................... | H04W 8/205 455/419 |

* cited by examiner

*Primary Examiner* — Thanh C Le (57) ABSTRACT

A system for mobile computing device selection and operation thereof, the system including: a memory configured to include one or more executable instructions; a controller configured to execute the executable instructions; and where the executable instructions enable the controller to: establish a first short-range wireless connection (SRWC) with a first mobile computing device; establish a second SRWC with a second mobile computing device; retrieve account data from the first mobile computing device via the first SRWC; retrieve account data from the second mobile computing device via the second SRWC; receive a user input regarding the retrieved account data; determine whether the retrieved account data is associated with the first or second mobile computing device; and operate the first or second mobile computing device based on the determination of whether the retrieved account data is associated with the first or second mobile computing device.

8 Claims, 7 Drawing Sheets

LEGEND
10: vehicle communications system
12: vehicle
14: wireless carrier systems
16: land communications network
18: computer
20: data center
28: vehicle electronics
30: telematics unit
32: microphone
34: control inputs (push buttons)
36: audio system
38: visual display
40: GPS module
42: vehicle system modules (VSM)
44: communications bus
46: entertainment bus
50: cellular chipset
52: processor
54: digital memory device
56: antenna system
57: mobile computing device
59: user interface
60: constellation of GPS satellites
61: electronic memory
62: communication satellite
64: uplink transmitting station
66: cell towers
70: cell tower
72: cellular network infrastructure
80: one or more switches
81: data controller
82: server
84: database
86: live advisor
88: voice response system (VSR)
90: local area network

SYSTEM AND METHOD TO SELECT AND OPERATE A MOBILE DEVICE THROUGH A TELEMATICS UNIT

INTRODUCTION

A vehicle's telematics unit can pair with cellular devices and proactively use these cellular devices to place outgoing calls and receive incoming calls. Such usage can be convenient for vehicle operators while driving. However, when multiple cellular devices are paired to the telematics unit, the vehicle operator is currently required to select which of the paired devices to place the call. This call placing strategy can be confusing and burdensome for the vehicle operator, especially while driving. Moreover, such confusion can be frustrating and distracting, which can end up making vehicle operation more difficult than one would want. It is therefore desirable to provide a system and method that can simplify placing a call through a telematics unit after having been paired with multiple cellular devices.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes A method for mobile computing device selection and operation thereof, the method including: retrieving, via a controller, account data from a plurality of mobile computing devices; and in response to a user input related to the retrieved account data, via the controller, operating one mobile computing device, from the plurality of mobile computing devices, determined to be associated with the user input. Other embodiments of this aspect include corresponding computer systems, apparatus, and computer programs recorded on one or more computer storage devices, each configured to perform the actions of the methods.

Implementations may include one or more of the following features. The method further including at least temporarily storing to a memory, via the controller, the retrieved account data. The method further including: where the account data is retrieved from each mobile computing device of the plurality of mobile computing devices via an independent short-range wireless connection (SRWC); severing the respective SRWC with at least one mobile computing device of the plurality of mobile computing devices; and erasing from the memory, via the controller, the retrieved account data from the at least one mobile computing device with the severed respective SRWC. The method where the account data includes contact information for one or more personal contacts. The method where the user input is a speech request. The method where operating one mobile computing device, from the plurality of mobile computing devices, is determined to be associated with the user input, at least in part, based on voice detection and recognition. The method where the one mobile computing device, from the plurality of mobile computing devices, is determined to be associated with the user input, at least in part, based on an auditorily provided request prompt. The method where operating one mobile computing device, from the plurality of mobile computing devices, is determined to be associated with the user input, at least in part, based on the mobile computing device from which the account data was retrieved. The method where operating the mobile computing device is defined by establishing or attempting to establish communications with a remote party via a wireless carrier system. Implementations of the described techniques may include hardware, a method or process, or computer software on a computer-accessible medium.

One general aspect includes a system for mobile computing device selection and operation thereof, the system including: a memory configured to include one or more executable instructions; a controller configured to execute the executable instructions; and where the executable instructions enable the controller to: establish a first short-range wireless connection (SRWC) with a first mobile computing device; establish a second SRWC with a second mobile computing device; retrieve account data from the first mobile computing device via the first SRWC; retrieve account data from the second mobile computing device via the second SRWC; receive a user input regarding the retrieved account data; determine whether the retrieved account data is associated with the first or second mobile computing device; and operate the first or second mobile computing device based on the determination of whether the retrieved account data is associated with the first or second mobile computing device. Other embodiments of this aspect include corresponding computer systems, apparatus, and computer programs recorded on one or more computer storage devices, each configured to perform the actions of the methods.

Implementations may include one or more of the following features. The system where the executable instructions further enable the controller to at least temporarily store, to the memory, the account data retrieved from the first and second mobile computing devices. The system where the executable instructions further enable the controller to: sever the first SRWC and/or second SRWC; upon the first SRWC being severed, erase the account data, from the memory, associated with the first mobile computing device; and upon the second SRWC being severed, erase the account data, from the memory, associated with the second mobile computing device. The system where the account data retrieved from the first and second mobile computing devices includes contact information for one or more mobile-device-stored personal contacts. The system where the user input is a speech request. The system where the determination of whether the account data relates to the first or second mobile computing device is, at least in part, based on voice detection and recognition. The system where the determination of whether the account data relates to the first or second mobile computing device is, at least in part, based on an auditorily provided request prompt. The system where the determination of whether the account data relates to the first or second mobile computing device is, at least in part, based on the mobile computing device from which the account data was retrieved. The system where operation of one of the first and second mobile computing devices includes establishing or attempting to establish communications with a remote party via a wireless carrier system. Implementations of the described techniques may include hardware, a method or process, or computer software on a computer-accessible medium.

One general aspect includes a non-transitory and machine-readable medium having stored thereon executable instructions adapted to select and operate a mobile computing device, which when provided to a controller and executed thereby, causes the controller to: retrieve personal contact information from the first mobile computing device; retrieve personal contact information from the second mobile computing device; receive a user input regarding at least one retrieved personal contact; determine whether the at least one retrieved personal contact is associated with the first or second mobile computing device; and operate the first or second mobile computing device to establish, or attempt to establish, via a wireless carrier system, communications with a remote party based on the determination of whether the at least one retrieved personal contact is associated with the first or second mobile computing device. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including: establish a first short-range wireless connection (SRWC) with a first mobile computing device; establish a second SRWC with a second mobile computing device; retrieve personal contact information from the first mobile computing device via the first SRWC; retrieve personal contact information from the second mobile computing device via the second SRWC; at least temporarily store the retrieved personal contacts; sever the first SRWC and/or second SRWC; upon the first SRWC being severed, erase the personal contact information associated with the first mobile computing device; and upon the second SRWC being severed, erase the personal contact information associated with the second mobile computing device. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
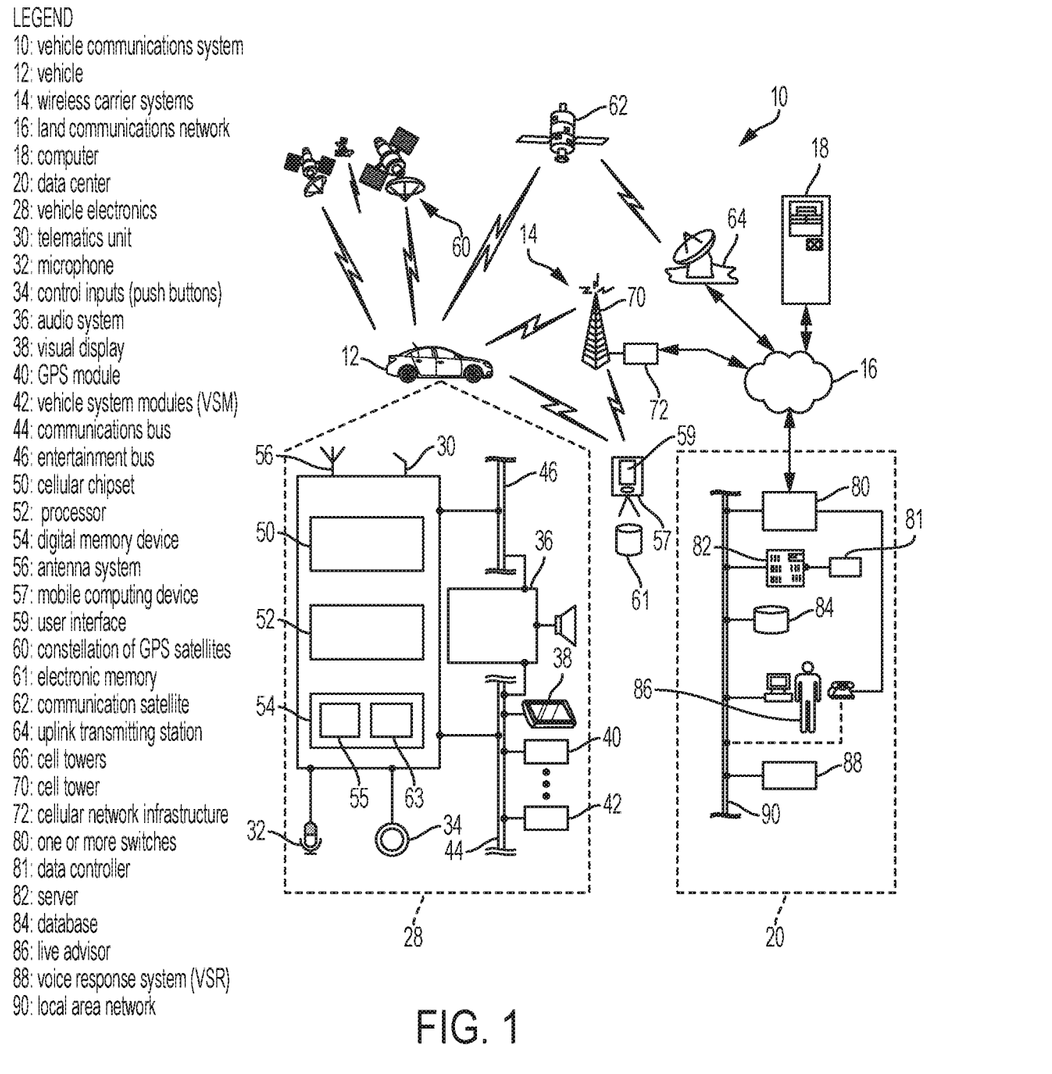
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables vehicle 12 to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One or more networked devices can simultaneously communicate with telematics unit 30, such as one or more mobile computing devices 57, for example, a smart phone, personal laptop computer, smart wearable device, or tablet computer having two-way communication capabilities, a netbook computer, or any suitable combinations thereof. The mobile computing device 57 can include computer processing capability, memory 61, a transceiver capable of communicating with wireless carrier system 14, a user interface 59, and/or a GPS module capable of receiving GPS satellite signals and generating GPS coordinates based on those signals. User interface 59 may be embodied as a touchscreen graphical interface capable of user interaction as well as displaying information. Examples of the mobile computing device 57 include the iPhone™ manufactured by Apple, Inc. and the Droid™ manufactured by Motorola, Inc. as well as others. While the mobile computing device 57 may include the ability to communicate via cellular communications using the wireless carrier system 14, this is not always the case. For instance, Apple manufactures devices such as the various models of the iPad™ and iPod Touch™ that include the processing capability, interface 59, and the ability to communicate over a short-range wireless communication link such as, but not limited to, WIFI and Bluetooth. However, the iPod Touch™ and some iPads™ do not have cellular communication capabilities. Even so, these and other similar devices may be used or considered a type of wireless device, such as the mobile computing device 57, for the purposes of the method described herein.

Mobile device 57 may be used inside or outside of vehicle 12, and may be coupled to the vehicle by wire or wirelessly. The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless connection (SRWC) protocol (e.g., Bluetooth/Bluetooth Low Energy or Wi-Fi), telematics unit 30 and one or more mobile computing devices 57 may pair/link while within a wireless range (e.g., prior to experiencing a disconnection from the wireless network). In order to pair, each mobile computing device 57 and telematics unit 30 may act in a BEACON or DISCOVERABLE MODE having a general identification (ID); SRWC pairing is known to skilled artisans. This ID may include, for example, the device's name, unique identifier (e.g., serial number), class, available services, and other suitable technical information. Mobile computing device 57 and telematics unit 30 may also pair via a non-beacon mode. In these instances, the data center 20 may participate in pairing mobile computing device 57 and telematics unit 30. For example, the data center 20 may initiate the inquiry procedure between the telematics unit 30 and mobile computing device 57. And data center 20 may identify mobile computing device 57 as belonging to the user of vehicle 12 and then receive from the mobile computing device 57 it's unique mobile device identifier and authorize the telematics unit 30 via the wireless communication system 14 to pair with this particular ID.

Once SRWC is established, the devices may be considered bonded as will be appreciated by skilled artisans (i.e., they may recognize one another and/or connect automatically when they are in a predetermined proximity or range of one other. In other words—they may become, at least temporarily, network participants). Data center 20 may also authorize SRWC on an individual basis before completion.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; voice assistance; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

Voice assistance is another one of the services provided by telematics unit 30 and may be provided via a voice assistant module 55 downloaded as an application program interface (API) suite to telematics memory 54. Voice assistant module 55 can perform one or more tasks for a user via a frontend automatic speech recognition system (discussed below). In certain embodiments, voice assistant 55 provides information for a user pertaining to one or more systems of the vehicle 12 (e.g., pertaining to operation of vehicle cruise control systems, lights, infotainment systems, climate control systems, and so on). Also in certain embodiments, the voice assistant(s) provides information for a user pertaining to general personal assistance (e.g., pertaining to voice interaction, making to-do lists, setting alarms, music playback, streaming podcasts, playing audiobooks, other real-time information such as, but not limited to, weather, traffic, and news, and pertaining to one or more downloadable skills).

Figure 2:
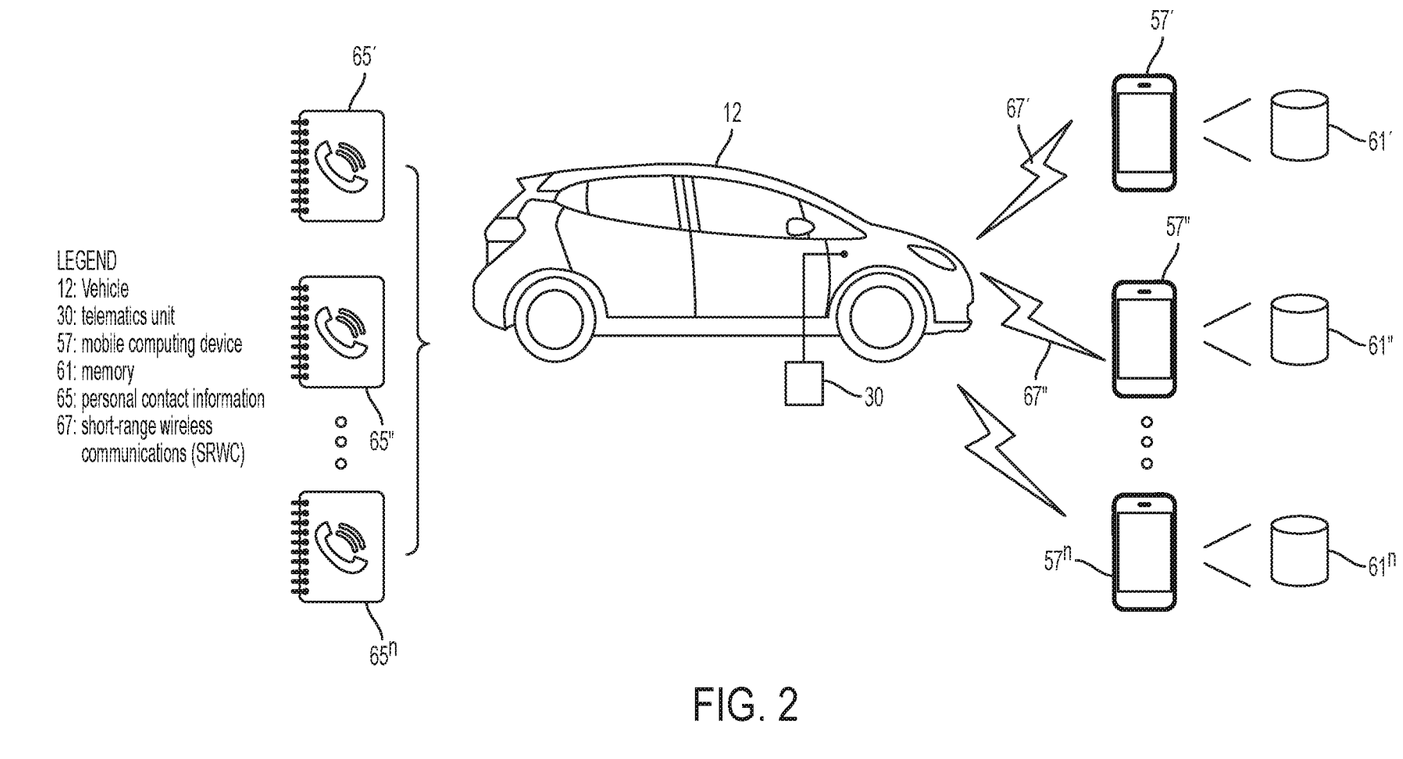
FIG. 2 shows an exemplary block diagram for one or more aspects of the system and method disclosed herein.
Figure 5:
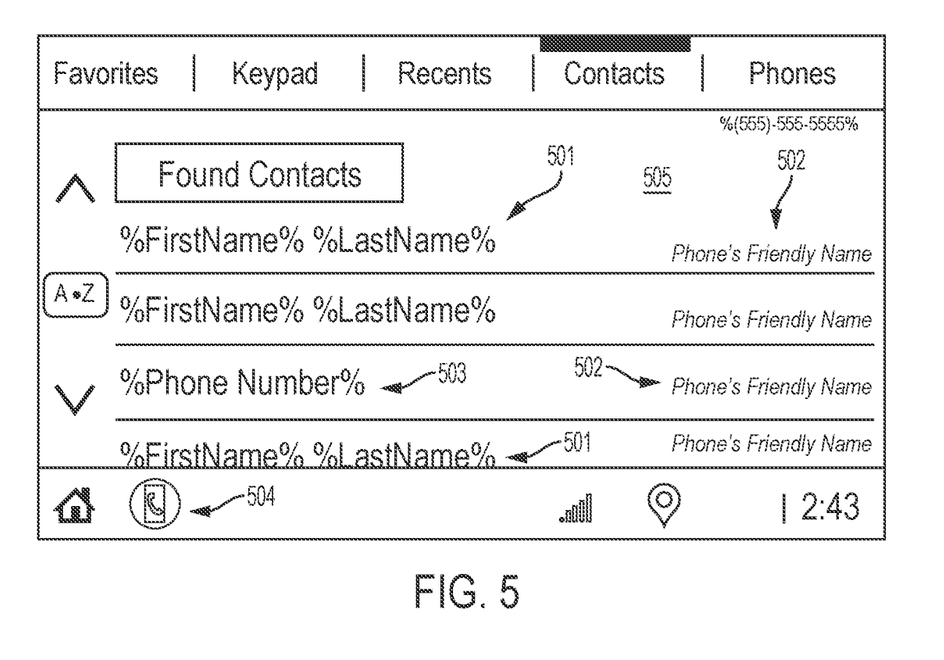
FIG. 5 shows an exemplary environment for one or more aspects of the system and method disclosed herein.

A contact extraction module 63 is another of the services provided by telematics unit 30 and may be provided via being downloaded as an API suite to telematics memory 54. With additional reference to FIG. 2, upon a SRWC 67 being established with one or more mobile computing devices 57 (e.g., first mobile computing device 57' and second mobile computing device 57"), contact extraction module 63 will retrieve the account data such as personal contact information 65 (e.g., first contact phonebook 65' and second phonebook 65") from the memory 61 of each connected mobile computing device 57 and subsequently download the personal contact information in an organized manner into digital memory device 54. For example, contact extraction module 63 may correspond with an API suite downloaded to the memory 61 of each mobile computing device 57 (e.g., the Contact Provider aspect of the Content Provider API for ANDROID™). This corresponding API suite generally allows extraction module 63 to fetch personal contact information from each mobile computing device 57. Contact extraction module 63 will also enable each personal contact fetched from each mobile computing device 57 to be logically grouped in an organized manner with other contacts as well as capable of being displayed via visual display 38 in an organized manner (see FIG. 5). For example, contact extraction module 63 may enable each contact to be displayed by the contact's first and last name, phone number, as well as the phone's friendly name of the mobile computing device 57 from which the contact originated. In one or more alternative embodiments, contact extraction module 63 may collaborate with an API located at data center 20 (i.e., server 82) to extract the personal contact information from one or more mobile computing devices 57. As can be seen by skilled artisans, in these embodiments, the data center 20 will act as a relay which sends the contact information to the extraction module 63 via wireless carrier service 14.

Focusing back on FIG. 1, GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen (capable of user interaction via a graphical user interface aspect) on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live advisor 86 by regular phone, backend computer 87, or to the automated VRS 88 using VoIP. Server 82 can incorporate a data controller 81 which essentially controls the operations of server 82. Server 82 may control data information as well as act as a transceiver to send and/or receive the data information (i.e., data transmissions) from one or more of the database 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Figure 3:
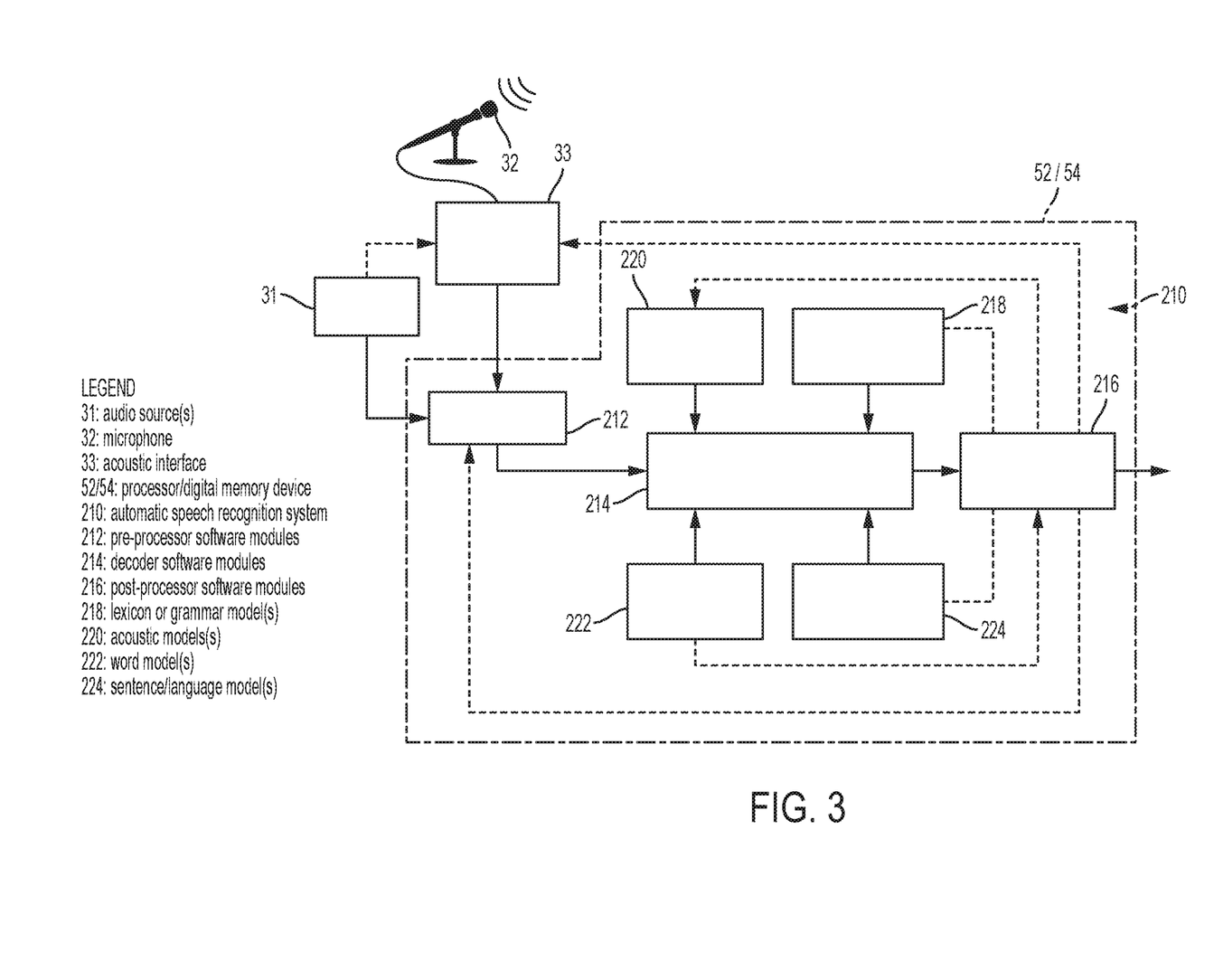
FIG. 3 is a block diagram depicting an embodiment of an automatic speech recognition (ASR) system that is capable of utilizing the system and method disclosed herein.

Turning now to FIG. 3, there is shown an exemplary architecture for an automatic speech recognition system (ASR) system 210 that can be used to enable the presently disclosed method. The ASR system 210 can be incorporated into any client device, such as those discussed above, including frontend voice assistant module 55 and backend automated voice response system (VRS) 88. An ASR system that is similar or the same to ASR system 210 can be incorporated into one or more remote speech processing servers, including one or more servers located in one or more computer systems. In general, a vehicle occupant vocally interacts with an ASR system for one or more of the following fundamental purposes: training the system to understand a vehicle occupant's particular voice (i.e., voice detection); storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 3 illustrates just one specific exemplary ASR system 210. The system 210 includes a sensor to receive speech such as the vehicle microphone 32, and an acoustic interface 33 such as a sound card having an analog to digital converter to digitize the speech into acoustic data. The system 210 also includes a memory such as the memory 128 for storing the acoustic data and storing speech recognition software and databases, and a processor such as the processor 126 to process the acoustic data. The processor functions with the memory and in conjunction with the following modules: one or more front-end processors, pre-processors, or pre-processor software modules 212 for parsing streams of the acoustic data of the speech into parametric representations such as acoustic features; one or more decoders or decoder software modules 214 for decoding the acoustic features to yield digital subword or word output data corresponding to the input speech utterances; and one or more back-end processors, post-processors, or post-processor software modules 216 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 214. First, grammar and/or lexicon model(s) 218 can provide rules governing which words can logically follow other words to form valid sentences. In a broad sense, a lexicon or grammar can define a universe of vocabulary the system 210 expects at any given time in any given ASR mode. For example, if the system 210 is in a training mode for training commands, then the lexicon or grammar model(s) 218 can include all commands known to and used by the system 210. In another example, if the system 210 is in a main menu mode, then the active lexicon or grammar model(s) 218 can include all main menu commands expected by the system 210 such as call, dial, exit, delete, directory, or the like. Second, acoustic model(s) 220 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 102 such as the remote server 104. For example, grammar models, acoustic models, and the like can be stored in memory 152 of one of the remote server controller 148 and/or storage device 156 in the remote server 104 and communicated to the vehicle telematics unit 30 for in-vehicle speech processing. Similarly, speech recognition software can be processed using processors of one of the servers 82 in the data center 20. In other words, the ASR system 210 can be resident in the vehicle 102 or distributed across the remote server 104, and/or resident in one or more computer systems.

First, acoustic data is extracted from human speech wherein a vehicle occupant speaks into the microphone 120, which converts the utterances into electrical signals and communicates such signals to the acoustic interface 33. A sound-responsive element in the microphone 120 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 212 transforms the continuous stream of digital speech data into discrete sequences of acoustic parameters. More specifically, the processor 126 executes the pre-processor module(s) 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian MINI process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The MINI can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference pattern is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 216 receives the output data from the decoder module(s) 214 for any suitable purpose. In one example, the post-processor software module(s) 216 can identify or select one of the reference patterns from the N-best list of single or multiple word reference patterns as recognized speech. In another example, the post-processor module(s) 216 can be used to convert acoustic data into text or digits for use with other aspects of the ASR system or other vehicle systems such as, for example, one or more NLP engines 173/175. In a further example, the post-processor module(s) 216 can be used to provide training feedback to the decoder 214 or pre-processor 212. More specifically, the post-processor 216 can be used to train acoustic models for the decoder module(s) 214, or to train adaptation parameters for the pre-processor module(s) 212.

Figure 4:
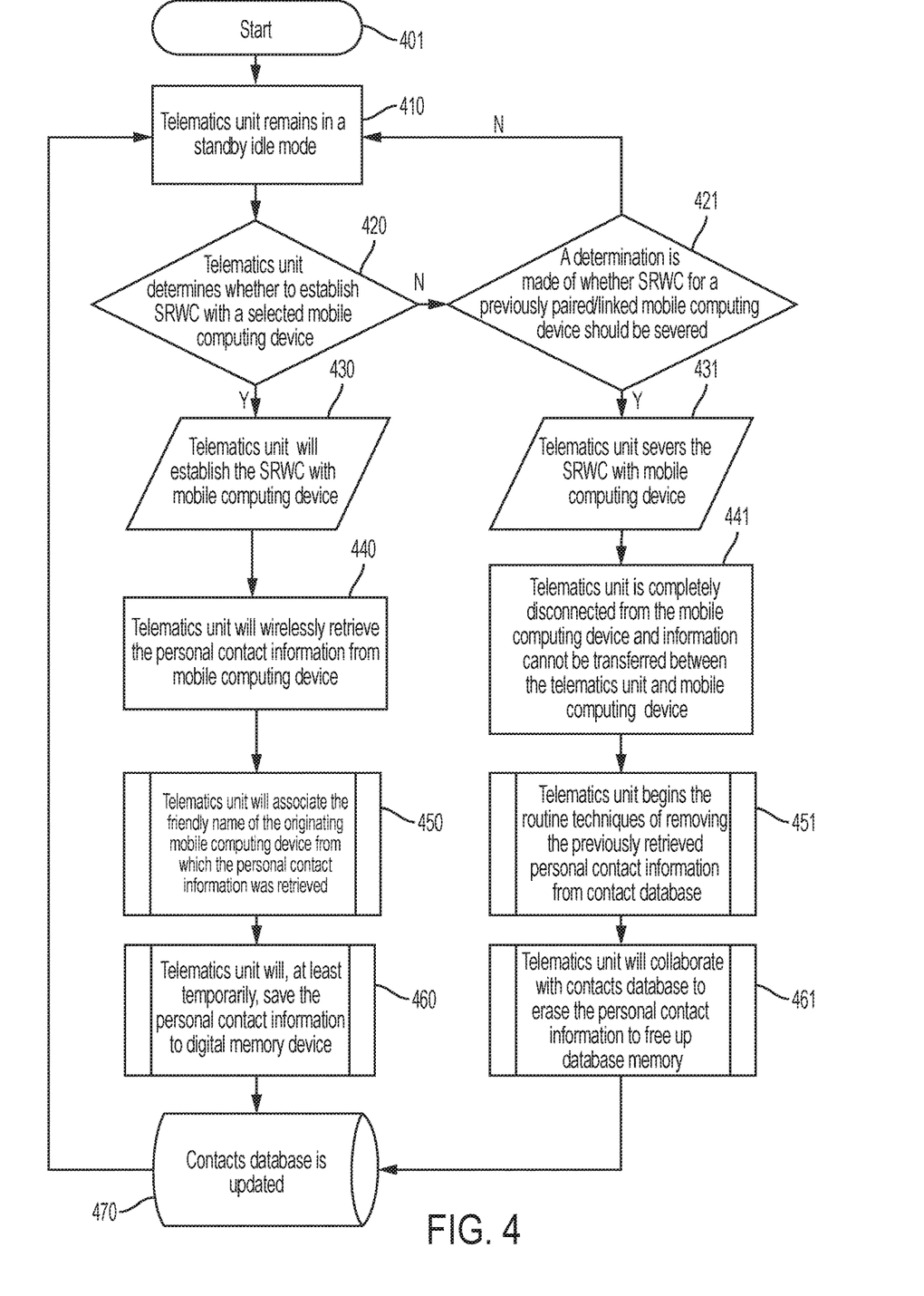
FIG. 4 is a flowchart of a process for downloading personal contacts from a mobile computing device in accordance with one or more aspects of the system and method disclosed herein.

Turning now to FIG. 4, there is shown an embodiment of a method 400 to download (i.e., retrieve) personal contacts from one or more mobile computing devices 57 and/or to remove previously downloaded personal contacts from telematics unit 30. One or more aspects of method 400 may be completed through contact extraction module 63 being implemented by telematics unit 30, which may include one or more executable instructions incorporated into memory device 54. One or more ancillary aspects of method 400 may, for example, be completed through mobile computing device 57 and data center 20. Skilled artisans will see that Method 400 may be completed between telematics unit 30 and multiple mobile computing devices (e.g., first mobile computing device 57', second mobile computing device 57", . . . $n^{th}$ mobile computing device 57$^n$) and such completion may be conducted simultaneously or sequentially.

Method 400 is supported by telematics unit 30 being configured to establish short-range wireless communications (SRWC) 67 with one or more mobile computing devices 57. This configuration may be established by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., memory device 54). Method 400 is further supported by preconfiguring telematics unit 30 (and possibly data center 20) to store the contact extraction module 63 as well as one or more other APIs in memory device 54. Method 400 is further yet supported by preconfiguring mobile computing device 57 to store a content provider API as well as one or more other software applications in its electronic memory 61 (e.g., contact extraction module 63) as well as being preconfigured to receive one or more prompts for user input via user interface 59.

Method 400 begins at step 410 in which telematics unit 30 remains in a standby idle mode. In step 420, telematics unit 30 determines whether to establish SRWC 67 with a selected mobile computing device 57. If a SRWC 67 is to be established with this mobile computing device 57, then method 400 moves to step 430; otherwise, method 400 will move to step 421 (which may begin the communications severance processes, discussed below). In step 430, telematics unit 30 will establish the SRWC 67 with mobile computing device 57 (discussed above). SRWC 67 pairing/linking may be established automatically upon mobile computing device 57 being within a wireless range of telematics unit 30 or this connection may be established upon a user commanding telematics unit 30 to pair/link with the mobile computing device 57, as is generally known. In step 440, telematics unit 30 will wirelessly retrieve the personal contact information from mobile computing device 57. Retrieval of the personal contact information may include, for example, processes generally known of contact provider software installed on the mobile computing device 57 (e.g., an AOSP Content Provider which organizes all of the people related data in mobile computing device 57). This retrieval process may moreover include telematics unit 30 cloning personal contact information from the memory 61 (generally known contact information such as: name information, phone number information, address information, email information, birthday information, etc.) and subsequently pulling this information to digital memory device 54.

The retrieval process may further include exemplary subroutine step 450, in which telematics unit 30 will associate the friendly name of the originating mobile computing device 57 from which the personal contact information was retrieved. Regardless of whether the contact contains a first and last name designator, telematics unit displays the friendly name 502 of the originating mobile computing device 57. (This aspect can be understood with reference to FIG. 5, in which a contact's first name and last name 501/naked phone number 503 is disclosed to be associated with the phone friendly name 502 of the specific originating mobile computing device 57.) Once the handle 502 has been assigned properly, in exemplary subroutine step 460, telematics unit 30 will, at least temporarily, save the personal contact information and association information to digital memory device 54. As such, this update allows for the amalgamation of personal contact information retrieved from multiple mobile computing devices 57 (i.e., up to the $N^{th}$ number of phones can be supported). Method 400 will then update its contacts database 470 accordingly and return to a standby idle state 410 until establishing/severing SWRC 67 with the mobile computing device 57 (or another mobile computing device 57).

In step 421, a determination is made of whether SRWC 67 for a previously paired/linked mobile computing device 57 should be severed. This determination may be made after a user commands telematics unit 30 to make such a disconnection. If a user does not command telematics unit 30 to disconnect from mobile computing device 57, however, telematics unit 30 can also make this determination by scanning to see if mobile computing device 57 remains in contact with the telematics unit 30 (i.e., remains within proximity of the vehicle interior). If it is determined to sever SRWC 67, then method 400 will move to step 431; otherwise, method 400 will return to a standby idle state 410 at least for the time being. In step 431, telematics unit 30 severs the SRWC 67 with mobile computing device 57.

After severance, in step 441, telematics unit 30 is completely disconnected from the mobile computing device 57 and information cannot be transferred between these two components, at least until another SRWC 67 is established. Method 400 may further include exemplary subroutine step 451, in which telematics unit 30 begins the routine techniques of removing the previously retrieved personal contact information from contact database 470. In this subroutine step, telematics unit 30 will search contacts database 470 for the personal contact information associated with the mobile computing device 57. Moreover, in subroutine step 461, telematics unit 30 will collaborate with contacts database 470 to erase the personal contact information to free up database memory. Upon the personal contact information being erased, method 400 return to a standby idle state 410 until establishing/severing SWRC 67 again with one or more mobile computing devices 57.

Figure 6:
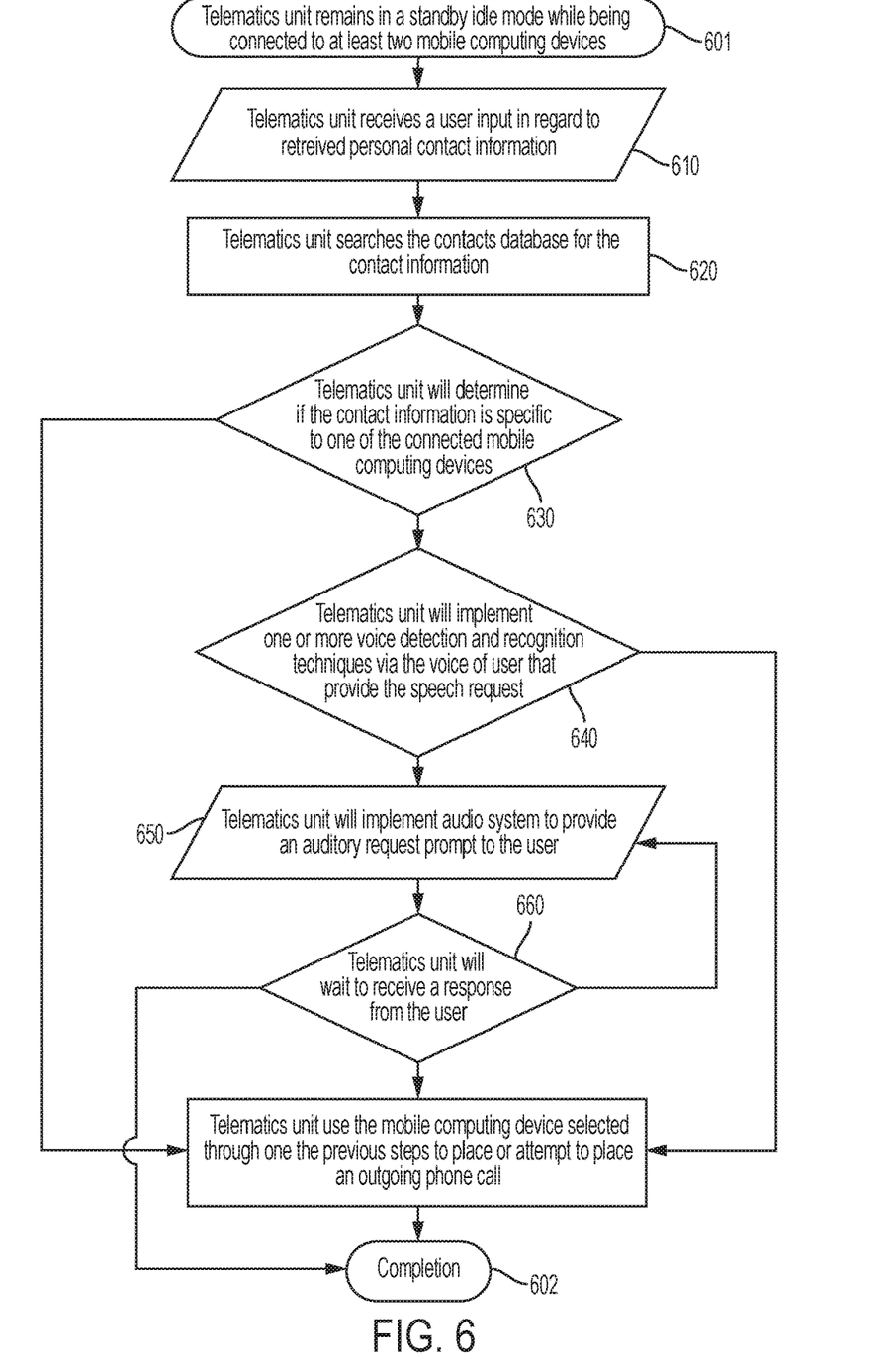
FIG. 6 is an exemplary flowchart of a process for mobile computing device selection and operation thereof in accordance with one or more aspects of the system and method disclosed herein.

Turning now to FIG. 6, there is shown an embodiment of a method 600 for mobile computing device 57 selection and operation thereof. One or more aspects of method 600 may be completed through telematics unit 30, which may be implementing voice assistant module 55 and/or contact extraction module 63, and which may include one or more executable instructions incorporated into memory device 54. One or more ancillary aspects of method 600 may otherwise, for example, be completed through one of the multiple wirelessly connected mobile computing devices 57 in conjunction with wireless carrier system 14 (i.e., up to the $N^{th}$ number of phones can be supported). Method 600 is supported by telematics unit 30 being configured to establish short-range wireless communications (SRWC) 67 simultaneously with multiple mobile computing devices 57 (in a similar manner as discussed for method 400).

Method 600 begins at 601 in which telematics unit 30 remains in a standby idle mode while being connected to at least two mobile computing devices 57 (e.g., first mobile computing device 57', second mobile computing device 57", . . . $n^{th}$ mobile computing device 57$^n$). In step 610, telematics unit 30 receives a user input in regard to retrieved personal contact information. In one or more embodiments, this user input may be a speech request. Speech requests are speech utterances expressed to make a phone call to a specific personal contact, from at least one of the linked mobile computing devices 57. Moreover, this speech request may be processed by voice assistant module 55 conducting one or more of the techniques discussed above (see FIG. 3). In such embodiments, the speech request may be, for example, "call David Willoughby's phone."

In step 620, telematics unit 30 searches the contacts database (see FIG. 4) for the contact information. For example, telematics unit 30 will pull up the personal contact information for "David Willoughby." Once the contact information is found, method will move to step 630 in which telematics unit 30 will determine if the contact information is specific to one of the connected mobile computing devices 57. For example, if the contact information for David Willoughby has only been associated with one mobile computing device 57, then that contact information is considered specific to that one device. Moreover, when this determination is made, telematics unit 30 will select the mobile computing device 57 (e.g., first mobile computing device 57', second mobile computing device 57", . . . $n^{th}$ mobile computing device 57") specifically associated with the contact information. Method 600 will then move to step 670. When it cannot be determined if the contact information is specific to one of the paired devices, for example, if more than one of the connected mobile computing devices 57 have the same contact information, method 600 will move to step 640.

In step 640, telematics unit 30 will implement one or more voice detection and recognition techniques via voice assistant module 55, discussed above, to detect the voice of user that provided the speech request. For example, if a user named Steven Hartley made the speech request "call David Willoughby's phone", telematics unit 30 will detect the speech request, process the speech request, and then recognize Steven's voice as providing the request. Alternatively, if a user named Eero Laansoo made the speech request "call David Willoughby's phone", telematics unit 30 will detect the speech request, process the speech, and then recognize Eero's voice as providing the request. Furthermore, once voice detection and recognition have been used to help determine which user provided the speech request, telematics unit 30 will select the mobile computing device 57 associated with the contact information. Method 600 will then move to step 670. If for some reason, however, the voice cannot be recognized (e.g., the user hasn't provided enough speech utterances for voice assistant module 55 to recognize the user's voice), method 600 will move to step 650.

In step 650, telematics unit 30 (e.g., via voice assistant module 55) will implement audio system 36 to provide an auditory request prompt to the user. For example, the request prompt may state "WHICH <CONTACT> DO YOU WANT TO CALL?" or "<CONTACT> ON STEVEN'S PHONE OR EERO'S PHONE?" This prompt also acts as a user notification to explain that the telematics unit 30 cannot determine which mobile computing device 57 should place the outgoing call. After auditorily providing the request prompt, method will move to step 660. In step 660, telematics unit 30 will wait to receive a response from the user. The response may, for example, be a speech utterance which clarifies the mobile computing device 57 that the user would like the outgoing call to be placed from. For example, the response may be "PLACE CALL FROM STEVEN'S PHONE." Upon receiving the user response, telematics unit 30 will select the mobile computing device 57 clarified in the response. Method 600 will then move to step 670. If, however, after a certain period of time no response is received, method 600 may return to step 650 and provide another auditory request prompt or method 600 may move to completion 602.

In step 670, telematics unit 30 uses the mobile computing device 57 selected through one of the previous steps (i.e., step 630, step 640, or step 660) to place or attempt to place an outgoing phone call. In essence, telematics unit 30 will use known techniques to command mobile computing device 57 to act as a wireless communications transceiver to establish cellular communications via wireless carrier system 14 for the purpose of establishing/attempting to establish communications with a remote party (e.g., David Willoughby). In addition, upon telematics unit 30 using mobile computing device 57 to place/attempt to place a call, method 600 will move to completion 602.

Figure 7:
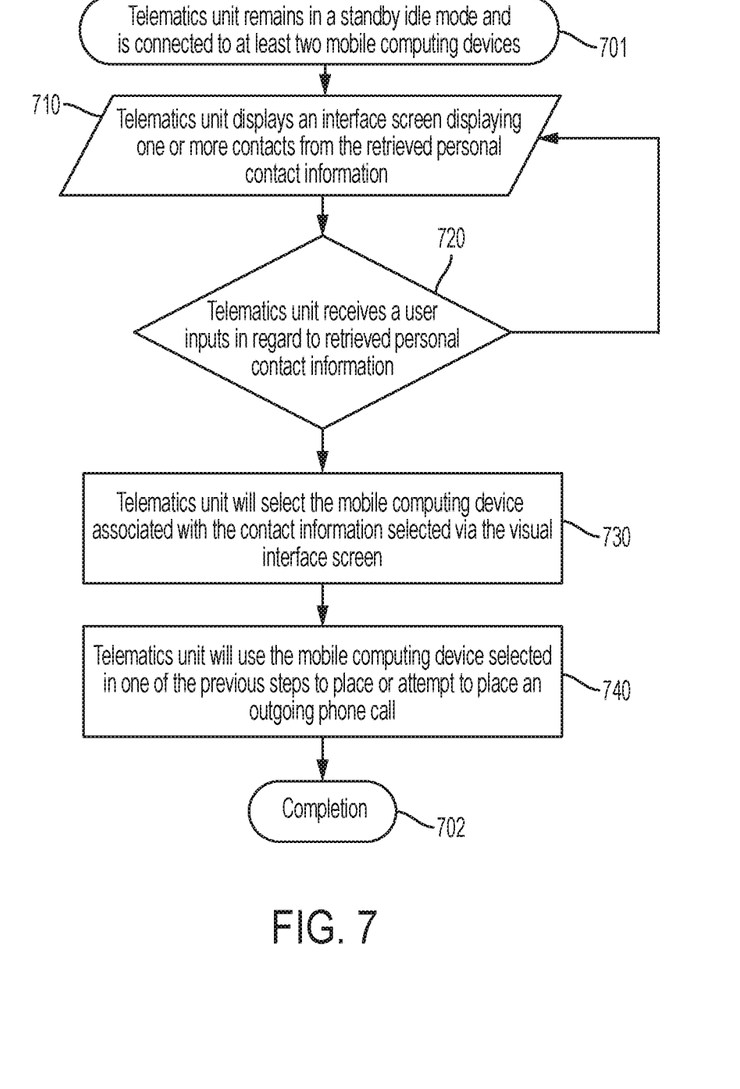
FIG. 7 is an exemplary flowchart of a process for mobile computing device selection and operation thereof in accordance with one or more aspects of the system and method disclosed herein.

Turning now to FIG. 7, there is shown another embodiment of a method 700 for mobile computing device 57 selection and operation thereof. Method 700 begins at 701 in which telematics unit 30 remains in a standby idle mode and is connected to at least two mobile computing devices 57 (e.g., first mobile computing device 57', second mobile computing device 57", . . . $n^{th}$ mobile computing device 57"). In step 710, telematics unit displays an interface screen displaying one or more contacts from the retrieved personal contact information. In step 720, telematics unit 30 receives a user input in regard to retrieved personal contact information. In one or more embodiments, this user input may be made through the interactive display 38. For example, with additional reference to FIG. 5, a user may command telematics unit 30 by pressing one or more virtual buttons 504 for placing phone calls via telematics unit 30 displayed on the visual interface screen 505 (i.e., the interface screen for establishing/attempting to establish remote party communications). In such embodiments, the user may press virtual button 504 to place a call. Once the input is received, method 700 will move to step 730; otherwise, the method will return to step 710 to continue displaying the personal contact information. In step 730, telematics unit 30 will select the mobile computing device 57 associated with the contact information selected via the visual interface screen 505. In step 740, telematics unit 30 use the mobile computing device 57 selected in one of the previous steps to place or attempt to place an outgoing phone call (discussed above for method 600).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system for mobile computing device selection and operation thereof, the system comprising:
    a memory configured to comprise one or more executable instructions;
    a controller configured to execute the executable instructions; and
    wherein the memory and controller are located in a telematics unit of a vehicle, and wherein the executable instructions enable the controller to:
        establish a first short-range wireless connection (SRWC) with a first mobile computing device, wherein the first mobile computing device is located remotely from the telematics unit;
        establish a second SRWC with a second mobile computing device, wherein the second mobile computing device is located remotely from the telematics unit;
        retrieve account data from the first mobile computing device via the first SRWC;
        retrieve account data from the second mobile computing device via the second SRWC;
        at least temporarily store the account data retrieved from both the first and second mobile computing devices to the memory;
        receive a user input regarding the retrieved account data;
        determine whether the retrieved account data is associated with the first or second mobile computing device; and
        wirelessly command, via the first or second SRWC, the first or second mobile computing device to act as a wireless communications transceiver for the telematics unit to establish long-range wireless communications via a wireless carrier system, based on the determination of whether the retrieved account data is associated with the first or second mobile computing device.

2. The system of claim 1, wherein the executable instructions further enable the controller to:
    sever the first SRWC and/or the second SRWC;
    upon the first SRWC being severed, erase the account data, from the memory, associated with the first mobile computing device; and
    upon the second SRWC being severed, erase the account data, from the memory, associated with the second mobile computing device.

3. The system of claim 1, wherein the account data retrieved from the first and second mobile computing devices comprises contact information for one or more mobile-device-stored personal contacts.

4. The system of claim 1, wherein the user input is a speech request.

5. The system of claim 4, wherein the determination of whether the account data relates to the first or second mobile computing device is, at least in part, based on voice detection and recognition.

6. The system of claim 4, wherein the determination of whether the account data relates to the first or second mobile computing device is, at least in part, based on an auditorily provided request prompt.

7. The system of claim 1, wherein the determination of whether the account data relates to the first or second mobile computing device is, at least in part, based on the mobile computing device from which the account data was retrieved.

8. The system of claim 1, wherein operation of one of the first and second mobile computing devices comprises establishing or attempting to establish communications with a remote party via a wireless carrier system.

* * * * *